Nov. 13, 1934.   G. W. CHENICEK   1,980,574
INSTRUMENT EXHIBITING MECHANISM
Filed Feb. 23, 1933   2 Sheets-Sheet 1

INVENTOR.
GEORGE W. CHENICEK
BY Bruce K. Brown
ATTORNEY

Nov. 13, 1934.   G. W. CHENICEK   1,980,574
INSTRUMENT EXHIBITING MECHANISM
Filed Feb. 23, 1933   2 Sheets-Sheet 2
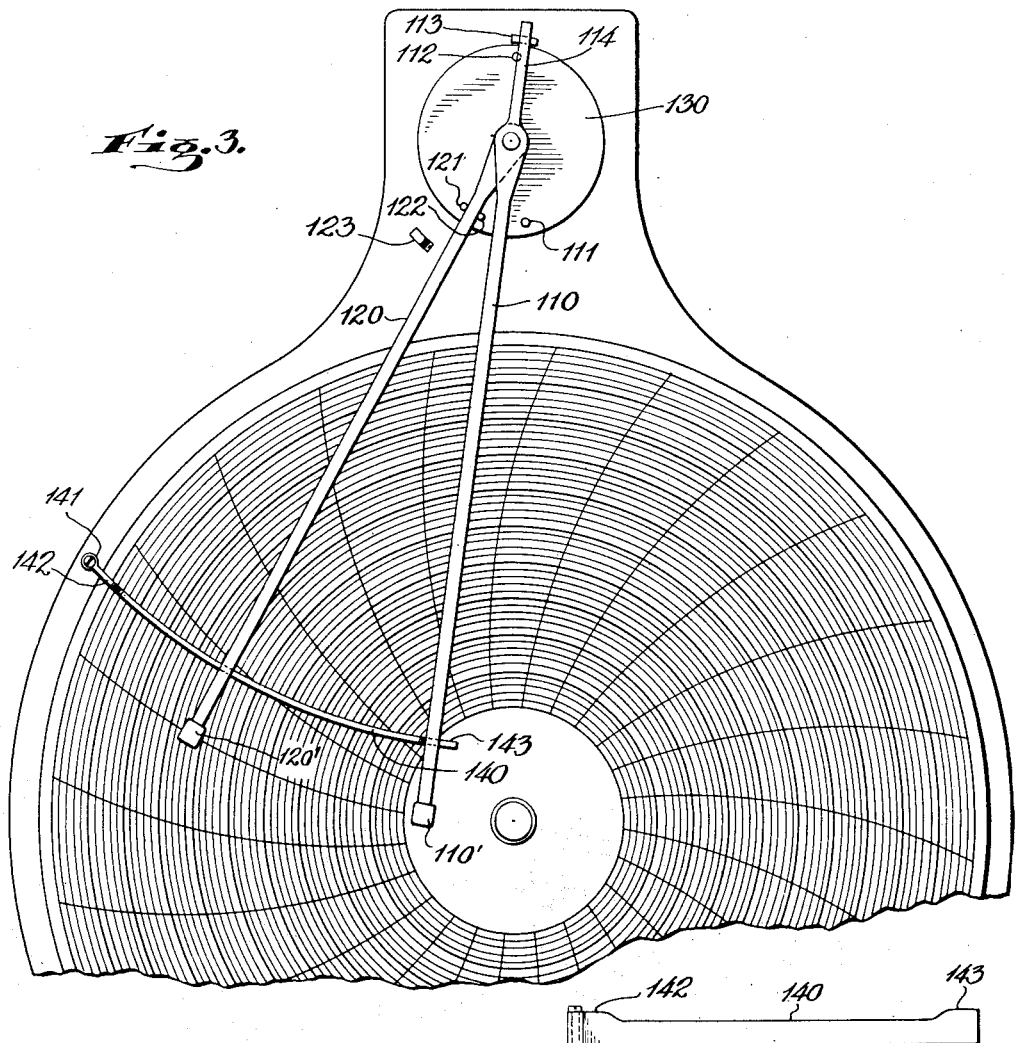
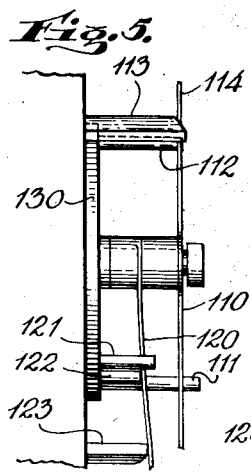
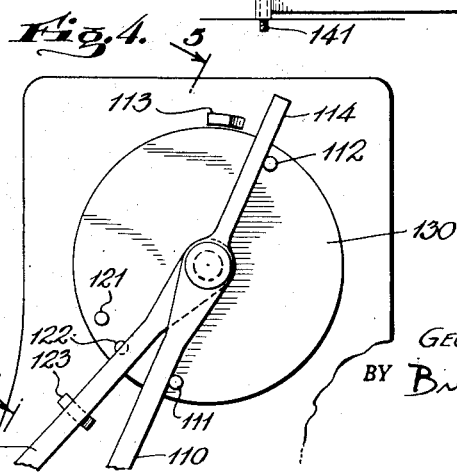
INVENTOR.
GEORGE W. CHENICEK
BY Bruce K. Brown
ATTORNEY Patented Nov. 13, 1934

1,980,574

UNITED STATES PATENT OFFICE 1,980,574

INSTRUMENT EXHIBITING MECHANISM

George W. Chenicek, Hammond, Ind., assignor to Standard Oil Company, Chicago, Ill., a corporation of Indiana Application February 23, 1933, Serial No. 657,934

10 Claims. (Cl. 234—1)

The present invention relates to instruments, such as indicating and recording meters, of the type in which a deflecting element oscillates about an axis and has associated with it means for exhibiting the deflection or changes in deflective position of said element. In an ordinary meter of this type the exhibiting means comprises an indicating pointer or pen arm which moves along a scale or scaled record surface, in accordance with the deflection movement of the meter shaft or other deflecting element to which the pointer or pen arm is secured so as to share all of the turning movements of said element. In such a meter the length of the scale element, whether it be a simple scale or a scaled record chart disc or strip, necessarily corresponds to the total angular extent or range of deflective movement of the deflecting element, and cannot be as great as is desirable in some cases without an undue increase in instrument dimensions.

The general object of the present invention is to provide an instrument of the above mentioned type with improved exhibiting means characterized by the simple and desirable manner in which the effective scale range of the instrument may be increased without a corresponding increase in the actual scale dimensions. To this end in accordance with the present invention, I combine with the deflecting element of the instrument, two pointers, pen arms or analogous exhibiting member, and means for operatively connecting said members one at a time to said element, so that as the latter moves through an initial portion of its range of deflection, one of said members is moved from one end to the other of a scale while the other member is moved from one end to the other of the same scale by said element as the latter moves through the final portion of said range. This makes the effective scale range of the instrument approximately double that of an instrument having a scale of the same actual length, and having a single pointer or pen arm connected to the deflecting element at all times in the manner heretofore customary.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 3 is a partial elevation of a modified form of recording meter;

Fig. 4 is an elevation of a portion of the instrument shown in Fig. 3, with parts shown in different relative positions;

Fig. 5 is a partial elevation as seen from the plane indicated by the line 5—5 of Fig. 4; and Fig. 6 is an elevation of a pen lifter member shown in Fig. 3.

Figure 1:
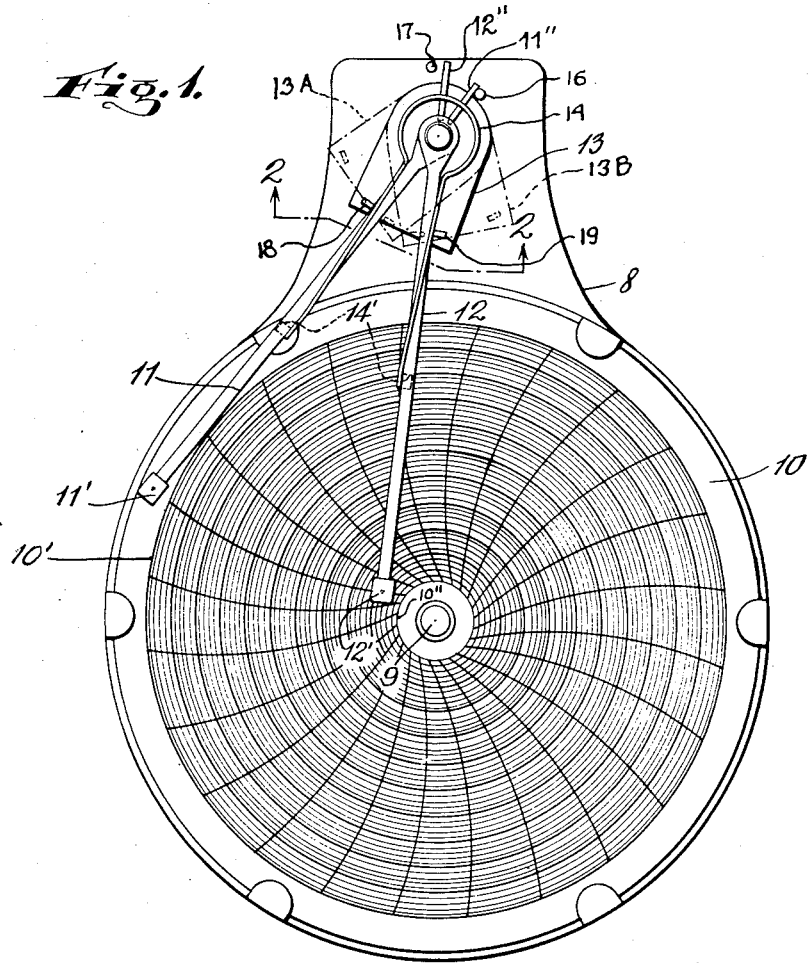
Fig. 1 is an elevation of a recording meter.
Figure 2:
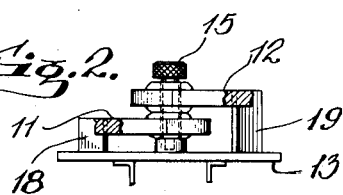
Fig. 2 is a partial section on the line 2—2 of Fig. 1.

In the embodiment of my invention shown in Figs. 1 and 2, 8 represents the framework of an instrument, such as a recording thermometer, comprising a scaled record chart 10 continuously rotated by a record driving shaft 9, and comprising a deflecting element. The latter includes a shaft 15 and a part 13 secured to said shaft, and is oscillated back and forth about the axis of the shaft 15 in accordance with changes in the value of the quantity measured. In respect to the features referred to, the instrument shown in Figs. 1 and 2 is of well known form, such as is frequently employed, for example, in measuring changes in fluid pressure within a Bourdon tube helix (not shown) which has one end connected to the element 13.

In the form of the present invention shown in Figs. 1 and 2 there are two pen arms 11 and 12 each mounted to turn about the shaft 15. The arms 11 and 12 carry pens 11' and 12' at their free ends for tracing records on the chart 10 in the usual manner, but the arms 11 and 12 differ from the single pen arm ordinarily employed in such an instrument in the manner in which they are connected to the deflecting element. As shown the part 13 is formed with projections 18 and 19 between which the arms 11 and 12 extend, and a spring 14 acts between the arms in a direction tending to hold the arm 11 against projection 18 and the arm 12 against the projection 19. As shown the spring 14 is of the hairpin type having a yoke portion curved around the shaft 15 and having its leg portions normally parallel to the arms 11 and 12, and each terminating at its free end in a clip portion 14' by which it is connected to the corresponding pen arm intermediate the ends of the latter.

While the spring 14 and projections 18 and 19 tend to cause each of the arms 11 and 12 to share all deflection movements of the shaft 15 and part 13, a stationary stop 16 prevents the arm 11 from sharing the movement of the shaft 15 and part 13, while the part 13 is within the portion of its range of its movement between the dotted line position 13A of Fig. 1 and an intermediate position of the part 13, said intermediate position being a little to the right of the position of the part 13 shown in full lines in Fig. 1. While part 13 is at the left of said intermediate position, the tension of the spring 14 holds the rear end 11″ of the arm 11 against the pin 16. Similarly when the part 13 occupies a position between its dotted line position 13B of Fig. 1 and said intermediate position, the spring 14 holds the rear end 12″ of the arm 12 against a second stationary pin or projection 17 from the instrument framework and thereby prevents the arm 12 from then sharing the deflection movements of the part 13.

On the assumption that the element 13 turns clockwise as the quantity measured increases in value, the angular position of the arm 11 thus varies with the angular position of the element 13 during the portion of the range of movement of the latter in which the value of the quantity measured varies between its zero value and a value which is approximately one-half of the maximum which the instrument is capable of measuring. When the last mentioned value is exceeded the arm 11 is moved against and held stationary by the projection 16, and the arm 12, previously held stationary in contact with the projection 17, then moves with the element 13. The arm 12 thus shares the movement of the element 13 during the portion of its range of movement corresponding approximatetly to the upper half of the range of value of the quantity measured.

Preferably the parts are so arranged that both arms 11 and 12 move with the part 13 through a small angular movement of the latter adjacent its intermediate position, so that the arm 11 may be moved into or back from a rest position at the outer side of the outer or maximum scale line 10′ of the chart, as the arm 12 is moved from or back into a rest position at the inner side of the inner or zero scale line 10″ of the chart. This provides the clearance between the arms 11 and 12 required to permit full scale movement of each. Advantageously the two pens 11′ and 12′ are provided with inks of different colors so that the records traced by them may be more readily distinguished, though their records if made with ink of the same color may be distinguished by suitably taking into account the record marks at the inner side of scale line 10″ and at the outer side of scale line 10′.

The instrument shown in Figs. 1 and 2 is obviously characterized by the simplicity and effectiveness of the exhibiting means employed to obtain the desired scale range. A practically important advantage of the form of the invention shown in Figs. 1 and 2, arises from the comparative ease and small expense involved in providing certain forms of instruments now in extensive use with this form of my invention.

With the form of the invention shown in Figs. 1 and 2, the deflecting movement of the deflecting element, except when the latter is in or near its intermediate position, is resiliently opposed by the tension of the spring 14. That tension, however, need not be great enough to make its effect at all objectionable, particularly with various instruments such as expansion fluid thermometer and pressure gages constituting a practically important field of use for the invention. In such instruments the deflecting force is relatively powerful and the effect of the spring 14 may be readily allowed for in calibrating the instrument. Moreover, the use of a spring like, or analogous to the spring 14 is not essential, as other means may be employed to couple one exhibiting arm to, and to uncouple the other exhibiting arm from the deflecting element as the latter moves through its intermediate position may be employed. For example, I may employ arm coupling and uncoupling means of the type illustrated in Figs. 3–6.

The instrument shown in Figs. 3–6 comprises parts 110, 120 and 130 corresponding generally to the parts 11, 12 and 13, respectively, of Figs. 1 and 2, but differs from the instrument of Figs. 1 and 2 in the manner in which each of the members 110 and 120 is moved by the deflecting element 130 or held stationary according to the portion of its range of movement occupied by the element 130. During each period of operation in which the member 110 shares the movements of the deflecting element 130, it is caused to do so by virtue of the fact that it is then engaged as shown in Fig. 4 by projections or pins 111 and 112 carried by the member 130 so as to then prevent angular movement of the member 110 relative to the member 130. As the member 130 turns counterclockwise from its position shown in Fig. 4 through its intermediate position, the flexible rear end extension 114 of the member 110 engages and rides up on the cam edge of a stationary rest 113 carried by the instrument framework. This deflects the extension 114 away from the member 130 far enough to permit the pin 112 to move under the extension 114. The pin 111 may then move counter-clockwise away from the member 110 which remains stationary until a clockwise movement of the element 130 causes the pin 111 to engage the member 110 and gives the latter a corresponding movement. As the extension 114 is thereby moved out of engagement with the rest 113, the extension moves downward into the path of the pin 112 which is then in position for operative engagement as shown in Fig. 4.

While the member 110 is in engagement with the stationary rest 113 as shown in Fig. 3, the member 120 is caused to share the movements of the element 130 by reason of the fact that the arm 120 is then engaged at opposite sides by pins 121 and 122 carried by the member 130. As the member 120 moves to the clockwise limit of its motion, it engages a stationary rest 123 carried by the instrument framework and generally similar to the previously mentioned rest 113. As the member 120 engages and is moved up onto the rest 123, it is deflected away from the member 130 far enough to permit the passage of the pin 122 under the arm 120. The latter then remains stationary until the return counter-clockwise movement of the element 130 acts through the pin 121 to give a counter-clockwise movement to the member 120 carrying the latter out of engagement with the rest 123 and allowing it to move toward the member 130 far enough to permit its operative re-engagement with the pin 122.

To permit operative movements of the pen end of each of the members 110 and 120, between the inner and outer scale limits of the chart, the parts are advantageously so proportioned that the pen point end of the member 120 will be at the outer side of the outer scale limit of the chart when the member 120 is engaged and held stationary by the rest 123, and the pen point end of the member 110 will be at the inner side of the inner scale marking when its extension 114 is in engagement with the rest 113 and the arm 110 is thereby held stationary. In the particular construction shown in Figs. 3–6, the arm 120 and the extension 114 of the arm 110 are made sufficiently flexible to move transversely to the plane of deflection to readily permit them to bend into and out of engagement with the pins 122 and 112, respectively, thus avoiding the need for any special expedient to obtain the required relative movement transverse to said plane of said pins and the corresponding portions of the pen arms.

When either of the members 110 and 120 is in engagement with the corresponding rest 113 or 123, respectively, the corresponding pen 110' and 120' may be held out of engagement with the chart by a suitable pen lifting means. The latter as shown comprises a curved metal strip 140 supported at one end by a post 141 supported by the instrument framework at the margin of the chart, and extending inward. Adjacent its outer end, the member 140 has a rest portion 142 which is engaged by, and moves the pen end of the member 120 away from the chart when the intermediate portion of the member 120 is engaged and moved away from the member 130 by the rest 123. At its inner end, the member 140 is formed with another raised rest portion 143 which engages and moves the pen end of the member 110 away from the chart when the extension 114 engages, and is moved away from the member 130 by the rest 113. The pen lifting part 140 may be used as well with the form of the invention shown in Figs. 1 and 2, as with that shown in Figs. 3 to 6.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In an instrument, the combination with an element adapted to deflect about an axis through an angular deflection range, of a plurality of exhibiting members each adapted to deflect about said axis from one end to the other of a common deflection path of less angular extent than said range, and means through which said element moves one or another of said members along said path accordingly as said element is moving through one or another portion of its range of movement.

2. In an instrument, the combination with an element adapted to deflect about an axis, of means for exhibiting the deflection movements of said element comprising a scale having an angular extent which is a fraction only of the angular range of movement of said element, and a plurality of members, each adapted to turn about said axis from one end to the other of said scale and means for selectively connecting one or another of said members to said element for movement with the latter accordingly as said element is moving through one or another portion of its said deflection range.

3. In an instrument, the combination with an element adapted to turn about an axis through a range of movement including portions at opposite sides of an intermediate position of said element, a pair of exhibiting elements each pivoted to turn about said axis from one end to the other of a common scale path, yielding means tending to cause each member to turn with said element, and means for arresting the movement of one or the other of said members accordingly as said element is at one side or the other of its said intermediate position.

4. In an instrument, the combination of an actuating element and two exhibiting elements all mounted for turning movement about a common axis, resilient means acting between said members and tending to turn each away from the other, stops carried by said element restricting the movement of each element away from the other, and stationary means preventing movement of one of said members with said element during one portion of the range of movement of the latter and preventing movement of the other member with said element during another portion of the range of movement of said element.

5. In an instrument, an actuating element pivoted to turn about an axis and having two spaced apart stop portions, two exhibiting members pivoted to turn about the same axis and extending between said stop portions, resilient means acting between said members and tending to move each away from the other and into engagement with the adjacent stop portion and stationary means coacting with said elements to prevent one element from moving with the member during one portion of the range of turning movement of the latter and to prevent the other from moving with the member during another portion of said range of movement.

6. In an instrument, the combination of an actuating element and two exhibiting members all independently pivoted to turn about a common axis, resilient means acting between said members and tending to turn each away from the other, said element having stops restricting the movement of each member relative to the element away from the other member and two stationary stops one for and preventing movement of each member with said element during a portion of the movement of the element which is different from that during which the movement of the other element is prevented by the other stop.

7. In an instrument, the combination with an actuating element and two exhibiting members all pivoted to turn about a common axis, driving means for said members carried by said element and comprising one projection adapted to engage one of said members and give it movement in one direction and a second projection adapted to engage the other member and give it a corresponding movement in the opposite direction accordingly as said element turns in one direction through one portion or in the opposite direction through another portion of its range of movement, stationary means operatively engaging one or the other of said members and disengaging the other member and its projection according to the direction of movement of said element as the latter moves from one to the other of said portions of its range of movement, and means providing a scaled surface of an angular extent corresponding to the angular extent of each of said range portions along which each member is moved by said element through the portion of its range in which said member is engaged by the corresponding projection.

8. In an instrument, the combination with an actuating element and two exhibiting members all pivoted to turn about a common axis, driving means for said members carried by said element and comprising a separate driving projection for each member one of said projections engaging the corresponding member to give the latter movements in one direction and the other projection engaging the other member to give the latter movements in the opposite direction, and stationary means adapted to disengage each member from the corresponding projection when moved by the latter into a predetermined position in which said element is intermediate the ends of its range of movement, whereby further movement of said element in the direction in which the corresponding projection gives movement to said member produces no movement of the latter.

9. In a recording instrument, the combination with means providing a recording surface, of an element adapted to deflect about an axis through an angular deflection range, a pair of pens each adapted to deflect about said axis from one end to the other of a common recording path along said surface and of less angular extent than said range, means through which said element moves one or another of said pens along said path accordingly as said element is moving through one or another portion of its range of movement, and means for holding one pen out of contact with said surface when that pen is at one end of said path and holding the other pen out of contact with said surface when the last mentioned pen is at the other end of said path.

10. In an instrument, the combination with an actuating element and two exhibiting members all pivoted to turn about a common axis, driving means for each member comprising two projections carried by said element one or the other of which is adapted to engage the corresponding member and move it with the element accordingly as the latter turns in one direction or the other, and means operative on movement of said element in one direction through an intermediate position of the latter to then disengage one member from the projection adapted to move that member in the last mentioned direction, and operative on movement of said element in the opposite direction through said intermediate position to then disengage the other member and the projection adapted to move the last mentioned member in the last mentioned direction.

GEORGE W. CHENICEK.